United States Patent [19]

Arntz

[11] 4,240,850
[45] Dec. 23, 1980

[54] MAKING THERMALLY-INSULATED TUBING

[75] Inventor: Hans-Joachim Arntz, Wedemark, Fed. Rep. of Germany

[73] Assignee: Kabel- und Metallwerke, Gutehoffnungshütte AG, Hanover, Fed. Rep. of Germany

[21] Appl. No.: 34,409

[22] Filed: Apr. 30, 1979

[30] Foreign Application Priority Data

May 26, 1978 [DE] Fed. Rep. of Germany ....... 2823101

[51] Int. Cl.³ .................. B32B 31/06; B32B 5/20; B29C 27/28
[52] U.S. Cl. ............................. 156/78; 138/114; 138/148; 138/149; 138/151; 138/164; 138/DIG. 9; 156/218; 156/227; 156/293; 156/294
[58] Field of Search ............... 138/114, 148, 149, 151, 138/164, DIG. 9; 156/218, 227, 78, 79, 292, 293, 294

[56] References Cited

U.S. PATENT DOCUMENTS

| | | | |
|---|---|---|---|
| 3,307,590 | 3/1967 | Carlson | 138/149 |
| 3,557,840 | 1/1971 | Maybee | 138/149 |
| 3,563,825 | 2/1971 | Segura et al. | 138/149 X |
| 4,180,101 | 12/1979 | Wegge | 138/103 |
| 4,182,378 | 1/1980 | Dieter | 138/112 |

FOREIGN PATENT DOCUMENTS 1960932 6/1971 Fed. Rep. of Germany.
1221152 2/1971 United Kingdom.

OTHER PUBLICATIONS

Ferrigno, T. H., Rigid Plastics Foams (2nd ed.), New York: Reinhold Pub. Corp., pp. 172-173.

Primary Examiner—William A. Powell
Assistant Examiner—Robert A. Dawson
Attorney, Agent, or Firm—Smyth, Pavitt, Siegemund, Jones & Martella

[57] ABSTRACT

A strip is folded longitudinally around a tube to, thereby, establish an assembly of an inner and a concentric outer tube; individual slotted foam strips are placed in transverse orientation onto the strip just prior to folding; they will become spacers with V-shaped notches. Just prior to closing the outer split tube, foam is introduced into the ring space between the tubes which will spread freely through the notches.

3 Claims, 1 Drawing Figure

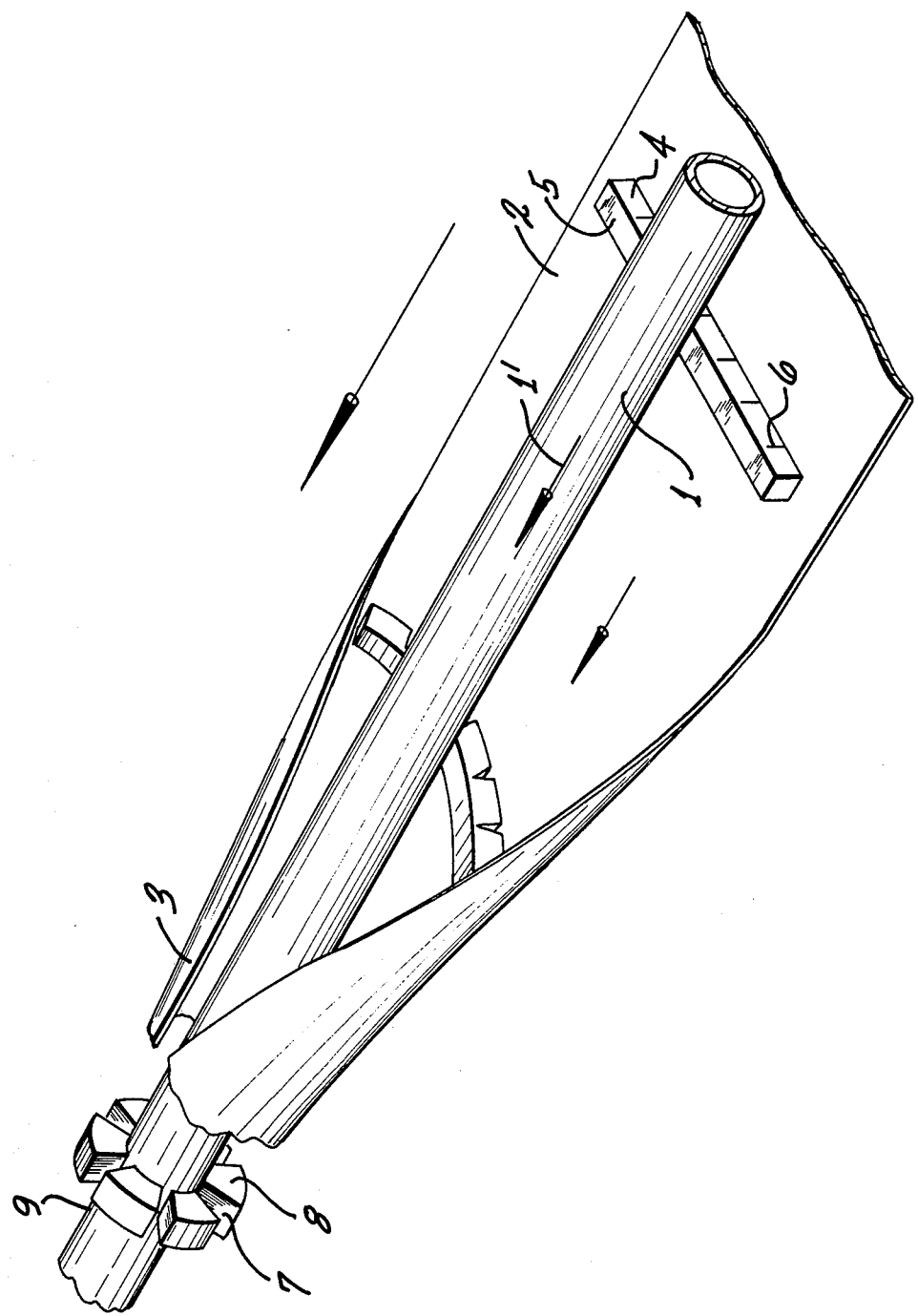

MAKING THERMALLY-INSULATED TUBING

BACKGROUND OF THE INVENTION

The present invention relates to the making of thermally insulated tubes, and more particularly the invention relates to the making of tubing in which a longitudinally paid strip is folded about a tube which will become the inner tube, carrying spacers onto which an outer tubing is formed from the strip; the ring space between the two tubes is to be filled with foam.

Tubing of the type to which the invention pertains is made in the stated manner, using a continuously paid tube as inner tube upon which spacers are placed before a strip is formed around these parts and into the outer tube; the latter, being a split tube, is subsequently closed along the adjoining edges. However, a polymer, or polymer blend, which will foam under particular conditions, is placed into that ring space, just ahead of the continuous tube-closing operation such as welding, soldering, etc.

The spacers are provided to hold the inner tube in the outer one and to ensure a concentric disposition of the tubes to each other. These spacers are constructed, e.g., as disks (see German Pat. No. 1,779,406), or a helical spacer is wound around the inner tube (see, e.g., German printed patent application No. 1,960,932).

Disk-shaped spacers are very suitable, but their individual placement and positioning is a cumbersome procedure. The particular disk-shaped spacers of the German patent require a particular device for placement. Helical spacers are also very suitable, but the space to be filled with foam is rather restricted in most instances. Moreover, a helical spacer is to some extend an impediment for the spreading of the foaming substance. Consequently, cavities may form in the foam which are detrimental to the insulative properties and particularly with regard to the uniformity in the insulation. Also, it was found that a helical spacer interfers to some extend with the closing of the split tube. If the tube closing involves the application of heat, the spacer may suffer locally.

DESCRIPTION OF THE INVENTION

It is an object of the present invention to provide a new and improved method of making a thermally insulated, concentric tube system.

It is another object of the present invention to provide a new and improved method of thermally insulating an inner tube in a more economical manner, including particularly the use of spacers which will not interfer with, nor be interfered with, the closing of a split tube formed around the inner tube.

It is a specific object of the present invention to improve a method of making a thermally insulated tube assembly which method includes, providing a tube which will become an inner tube, forming a strip into an outer split tube around the inner tube and closing the outer tube by bonding, welding, or the like.

In accordance with the preferred embodiment of the present invention, the method as per the specific object is improved by placing individual foam strip pieces transversely onto the strip just before the latter is folded into a tube so that these pieces are correspondingly folded onto the inner tube and become spacers thereby. The strip pieces have preferably slits which will open into V-shaped notches. Also, the strip pieces are preferably shorter than the circumference of the inner tube, thus leaving an axial gap. In any event, at least one axial gap through each of the resulting spacers is needed to provide for a free flow path for a foaming filler which will be fed into the ring space between inner and outer tubes just before the latter is closed. The gap, or one of the gaps, should be located just under the joint along which the strip edges will be welded, or otherwise bounded together. Multiple gaps are clearly preferred for reasons of allowing for ample flow space.

The preferred embodiment of the invention, the objects and features of the invention and further objects, features and advantages thereof will be better understood from the following description taken in connection with the accompanying drawings.

DESCRIPTION OF THE DRAWINGS

The FIG. 1 is a perspective view of a portion of a tubemaking assembly demonstrating how the invention can be practiced with advantage.

The FIG. 1 illustrates a tube 1, being, for example, a seamless-drawn copper tube. This tube, or tubing 1, is paid continuously and runs into the particular station in the direction of arrow 1'. The station illustrated is provided to longitudinally fold a strip 2 into a split tube and concentrically around the tube 1 which will become an inner tube. The strip 2 is, for example, made of polyvinylchloride. The tool, or type of tool, which folds such a strip into a tube is known per se and does not require elaboration.

Individual strip pieces 4 are placed on the strip 2, transversely to the extension thereof and at a point ahead of the split-tube-making tool, which is more to the right and in the foreground of the drawing. These pieces 4 are preferably made of rigid polyurethane and carry a thin reinforcing ribbon 5 on the side facing tube 1. Rigid polyurethane foam has a lower thermal conductivity than soft polyurethane foam. Moreover, rigid foam is more suitable for the spacing function.

The foam strip pieces 4 are provided with slits 6 so that upon folding strip 2 about tube 1, these slits open up and widen into V-shaped gaps or notches 7, being separated by portions 8 which are individual spacer pieces. The individual spacer blocks 8 are held together by the reinforcing strip 5. The resulting spacer configuration is shown to the far left in the FIGURE. Actually, the spacer is not visible on account of the folded-around strip which has been cut away in the illustration to expose the spacer.

The strip 2 is paid from a drum or spool disposed in the foreground of the view of the FIGURE and to the right. This strip is run up to be fed into the folding tool. The individual pieces 4 are placed on the strip 2 to be more or less clamped between strip 2 and tube 1. This way, strip pieces 4 are held during the folding and, surprisingly, one does not have to bond them to tube 1.

At some point, farther than the far upper-left portion of the FIGURE, one will close the split tube 3 through bonding or welding. However, prior to this tube closing step, polyurethane is fed into the ring space between the two tubes which will foam and fill the ring spaces.

It can readily be seen that the V-shaped notches 7 between the spacer elements 8 provide for free axial flow of the foaming filler and, in fact, cavities will not form. Moreover, it was found advantageous to select the length of pieces 4 to be a little shorter than the circumference of tube 1. Thus, the short ends of each strip piece 4 will not abut and an additional gap 9 of still wider dimensions than the V-notches 7 remains. These gaps 9 are right under the joint of the split tube, so that the spacer does not interfer with tube closing, nor will, e.g., welding the tube unduly heat any spacer material underneath as there is none.

The spacer pieces 4 may actually be paid from a drum or spool with an axis parallel to the tube's axis and a correspondingly transverse feed direction. Individual pieces are cut from a long strip being preferably provided already with the slots. German Pat. No. 1,779,599 describes the making of such a foam strip.

Alternatively, a foam strip may be prepared, extending lengthwise in the direction which will become the short extension of each piece 4. The slits 6 are lengthwise slits in such a strip. One will cut individual pieces 4 by cutting them from this strip transversely. In either case, rigid foam on a plastic ribbon (5) should be used to adequately hold the inner tube in the outer one, once the assembly has been completed.

The method as described can be practiced with equal advantage also in cases in which the outer tube is made from a metal strip. Also, the spaces will not interfer when such a metal tube is subsequently corrugated.

The invention is not limited to the embodiments described above, but all changes and modifications thereof not constituting departures from the spirit and scope of the invention are intended to be included.

I claim:

1. A method of making a thermally insulated, concentric tube system on a continuous basis which includes the steps of providing a first tube, forming a strip longitudinally into a split tube around the first tube, and closing the first tube, the improvement comprising:
    placing individual strip pieces of thermally insulating material on the strip, the strip pieces extending transversely to the longitudinal direction of the tubes, the pieces being sequentially folded around the first tube to become spacers as the strip is progressively folded into the split tube, at least one axial gap remaining in each resulting spacer; and
    filling space between the split tube and the first tube with foam prior to closing the split tube on account of said folding, the foam spreading axially through the gaps.

2. A method as in claim 1, the strip pieces being shorter than the circumference of the first tube, so that the gap results from failure of the ends of the strip pieces to abut upon being folded around the first tube.

3. A method as in claim 1 or 2, wherein the strip pieces have slits, resulting in V-shaped notches which include, or are in addition to, the said gap.

* * * * *